US010929459B2

(12) United States Patent
Jones et al.

(10) Patent No.: US 10,929,459 B2
(45) Date of Patent: Feb. 23, 2021

(54) GEOLOCATION RESTRICTED CONTENT REGISTRATION AND PUBLICATION

(71) Applicant: TaDaah, LLC, Gainesville, VA (US)

(72) Inventors: Zoree Jones, Gainesville, VA (US); Angela Michelle Ingram-Jones, Gainesville, VA (US)

(73) Assignee: TADAAH, LLC, Gainesville, VA (US)

( * ) Notice: Subject to any disclaimer, the term of this patent is extended or adjusted under 35 U.S.C. 154(b) by 223 days.

(21) Appl. No.: 16/000,018

(22) Filed: Jun. 5, 2018

(65) Prior Publication Data

US 2018/0349375 A1 Dec. 6, 2018

Related U.S. Application Data

(60) Provisional application No. 62/515,310, filed on Jun. 5, 2017.

(51) Int. Cl.
| | |
|---|---|
| *G06F 16/487* | (2019.01) |
| *G06F 21/10* | (2013.01) |
| *H04W 4/029* | (2018.01) |
| *H04W 4/021* | (2018.01) |
| *G06F 16/9537* | (2019.01) |
| *H04L 29/06* | (2006.01) |
| *H04L 29/08* | (2006.01) |
| *G06F 21/62* | (2013.01) |

(52) U.S. Cl.
CPC ........ *G06F 16/487* (2019.01); *G06F 16/9537* (2019.01); *G06F 21/10* (2013.01); *H04L 63/107* (2013.01); *H04L 67/1021* (2013.01); *H04W 4/021* (2013.01); *H04W 4/029* (2018.02); *G06F 21/6218* (2013.01); *G06F 2221/2111* (2013.01)

(58) Field of Classification Search
CPC .... G06F 16/9537; G06F 16/487; G06F 21/10; H04L 63/107; H04L 67/1021; H04W 4/029; H04W 4/021
USPC .......................................................... 707/736
See application file for complete search history.

(56) References Cited

U.S. PATENT DOCUMENTS

| | | | |
|---|---|---|---|
| 2006/0167896 A1* | 7/2006 | Kapur ................. | G06F 16/9535 |
| 2010/0205286 A1* | 8/2010 | Rechterman .......... | G06F 16/958 |
| | | | 709/223 |
| 2014/0082188 A1* | 3/2014 | Gutarin ................. | H04L 65/601 |
| | | | 709/224 |

(Continued)

*Primary Examiner* — Robert W Beausoliel, Jr.
*Assistant Examiner* — Pedro J Santos
(74) *Attorney, Agent, or Firm* — Holzer Patel Drennan (57) ABSTRACT

Content management server receives requests for geographically restricted domains and generates unique registrant identifiers responsive to the request based on the physical geographic location of the registrant and a related proximity condition. Each of the unique registrant identifiers identifying a registrant content server, and each of the registrant content servers storing content associated with the corresponding unique registrant identifier. The content management server receives queries from user devices, and the queries indicate a geographic location. The content management server identifies geographically relevant registrant content servers based on associated unique registrant identifiers relative to satisfied proximity conditions. The registrant content servers may communicate geographically relevant content objects to user devices.

22 Claims, 6 Drawing Sheets

(56) References Cited

U.S. PATENT DOCUMENTS

2015/0087303 A1* 3/2015 Hillary ................ H04W 4/021
                                                      455/435.1
2016/0119678 A1* 4/2016 Odryna ............ H04N 21/47202
                                                        725/49

* cited by examiner

GEOLOCATION RESTRICTED CONTENT REGISTRATION AND PUBLICATION

CROSS-REFERENCE TO RELATED APPLICATIONS

The present application claims benefit of priority to U.S. Provisional Patent Application No. 62/515,310, entitled "On-Demand, Location-Based, Digital Marketing Platform" and filed on Jun. 5, 2017, which is specifically incorporated by reference herein in its entirety.

BACKGROUND

A domain name system (DNS) is generally used by web browsers and servers to retrieve content posted online. Organizations such as businesses, schools, governments entities, etc. may register domain names to establish an online presence, and such registered domain names are then utilized to post content via content or web servers and consume content via web browsers and uniform resource locators (URLs). The DNS generally maps registered domain names and URLs to locations of web servers where the content may be retrieved.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

In one example implementation, a method includes generating a plurality of unique registrant identifiers, each of the plurality of unique registrant identifiers being based on a unique geographic source location identifier and a proximity condition. Each of the plurality of unique registrant identifiers identifying a registrant content server, and each of the registrant content servers storing content associated with the corresponding unique registrant identifier. The method further includes receiving a query from a user device. The query specifies a query geographic location. The method further includes identifying at least one unique registrant identifier of the plurality of unique registrant identifiers responsive to receiving the query. The identification is based on the query geographic location satisfying the proximity condition corresponding to the at least one unique registrant identifier. The method further includes transmitting a communication to at least one registrant content server corresponding to the identified at least one unique registrant identifier. The communication identifies the user device as satisfying the proximity condition corresponding to the identified at least one unique registrant identifier.

These and various other features and advantages will be apparent from a reading of the following Detailed Description.

DETAILED DESCRIPTION

A domain name system (DNS) is generally used by web browsers and servers to retrieve content posted online. Organizations such as businesses, schools, governments entities, etc. may register domain names to establish an online presence, and such registered domain names are then utilized to post and consume content online that can be accessed by web browsers via uniform resource locators (URLs). The DNS generally maps registered domain names and URLs to locations of web servers where the content may be retrieved. The DNS maps computer-readable coordinates (e.g., internet protocol (IP) addresses) to human-readable text (e.g., URLs). The DNS system, however, does not map information (e.g., content) to the physical location associated with the entity (e.g., the physical address of a business). Furthermore, the DNS system is misused because anyone can register and post confusingly similar information using confusingly similar domains (e.g., USPTO.gov and USPTO.com).

Implementations described herein provide a method and system for registration, publication, and consumption of location-based geotagged information. Organizations (referred to hereinafter as "registrant entities") utilize the implementations described to register a geographically unique domain (referred to hereinafter as "unique registrant identifiers") and publish geographically restricted content in association with the geographically unique domain. Each registrant entity is allocated and assigned (registers) a geographically unique domain inside of a shared, but non-overlapping area (by way of analogy, radio stations share the same radio spectrum inside of a given area (e.g., local community), but operate on non-overlapping frequencies). Similarly, a registrant entity registers a unique registrant identifier that is analogous to an allocation and assignment of a dedicated "traffic lane" (or its own radio station frequency) on a shared communications highway (or over shared spectrum) that prevents signaling interference from other registrant entities and unique registrant identifiers.

Although the "unique registrant identifier" or geographically unique "domain" is based on a single location (e.g., the physical address or GPS coordinates of a registrant entity), it is not one (1) location. A "unique registrant identifier" or geographically unique "domain" includes any location within an area ($A=\pi r^2$) of an individually unique set of base coordinates (e.g., 40.6892494, −74.0445004). Within any given area ($A=\pi r^2$), a plurality of registrant entities can be allocated a shared, but non-overlapping area that represents a unique registrant identifier for each respective registrant entity. For additional clarification, in the context of the implementations, a "unique registrant identifier" does not merely refer to a single physical address or set of coordinates (e.g., latitude, longitude) for the registrant entity, but includes a geofence that is calculated or determined by a dynamic area ($A=\pi r^2$) encircling the registrant entity's physical address or set of coordinates (e.g., a geometric area of 5,024 square miles encircling a physical address and/or set of coordinates with a 40 mile radius). The unique registrant identifiers are based on a "proximity condition" that identifies the area (e.g., a radius) or other area defining parameter (e.g., length and width, traffic area, community). The unique registrant identifiers further identify a registrant content server that are configured to serve stored content objects for transmission to one or more user devices. In some example implementations, the registrant content servers may be configured to provide services in addition to content. The registrant content server may be a virtualized server managed by the content management system or a server managed by the registrant entity at a different location from the content management server.

A registrant entity can publish geographically restricted content that can be publicly multicast, transmitted, delivered, beamed, etc. to the outer limits of a dynamic circumference ($C=\pi \times d$) encircling the registrant entity and to any area ($A=\pi r^2$) inside of the dynamic circumference. By way of illustration, if the registrant entity's physical location (e.g., latitude, longitude) is at the center and has a radius of 40 miles to the outer limits of the circle's circumference, then the "unique registrant identifier" could be used to describe (and be associated with) a plurality of locations inside the entire geometric area encircling the registrant entity's physical location. As such, in this particular instance, the "unique registrant identifier" would not only describe the registrant's physical location (e.g., latitude, longitude) but a plurality of locations inside a shared, but non-overlapping area defined by a circumference of 251 miles encircling the physical location ($\pi \times d$) (or simply 3.14×80) and an area of 5,024 square miles inside of the 251 mile circumference ($\pi \times r^2$) (or simply $(3.14) \times (40)^2$).

In some example implementations, the geographically restricted content may be accessed by user devices within a determined physical geographical proximity of the geographical location associated with the geographically unique domain (e.g., the unique registrant identifier). Thus, when a particular user device is physically located in the area defined by the unique registrant identifier of a registrant entity, the user device may receive or access content published by the registrant entity associated with its unique registrant identifier. In the same or alternative implementations, a user may provide a query with a selection of a geographical location, and geographically relevant content tagged to a physical location within a determined physical geographical proximity of the geographical location selected by the user may be presented to the user via a user device. Thus, content associated with unique registrant identifiers defining an area that falls within or overlaps with user query may be published to or accessed by the user.

Because the unique registrant identifiers are generated based on a real-world physical geographic location, the registrant identifiers are unique. If registrant entities are tied to the same or similar physical geographic locations (e.g., the same building), then a physical address may be used to differentiate the unique registrant identifiers. Unique registrant identifiers may be registered for each physical location of a business (e.g., each McDonald's restaurant). The unique registrant identifiers may be used by separate instances of a business (e.g., franchises) or the organization to publish location-specific content associated with a geographically unique domain. Thus, rather than navigating the world wide web to find location-specific web content using the existing DNS system, a user may browse geographically tagged content using the user's current geographic location (e.g., detected by a computing device) or a selected geographic location (e.g., selected via a user interface of a computing device). These and other implementations are described further with respect to the figures.

Figure 1:
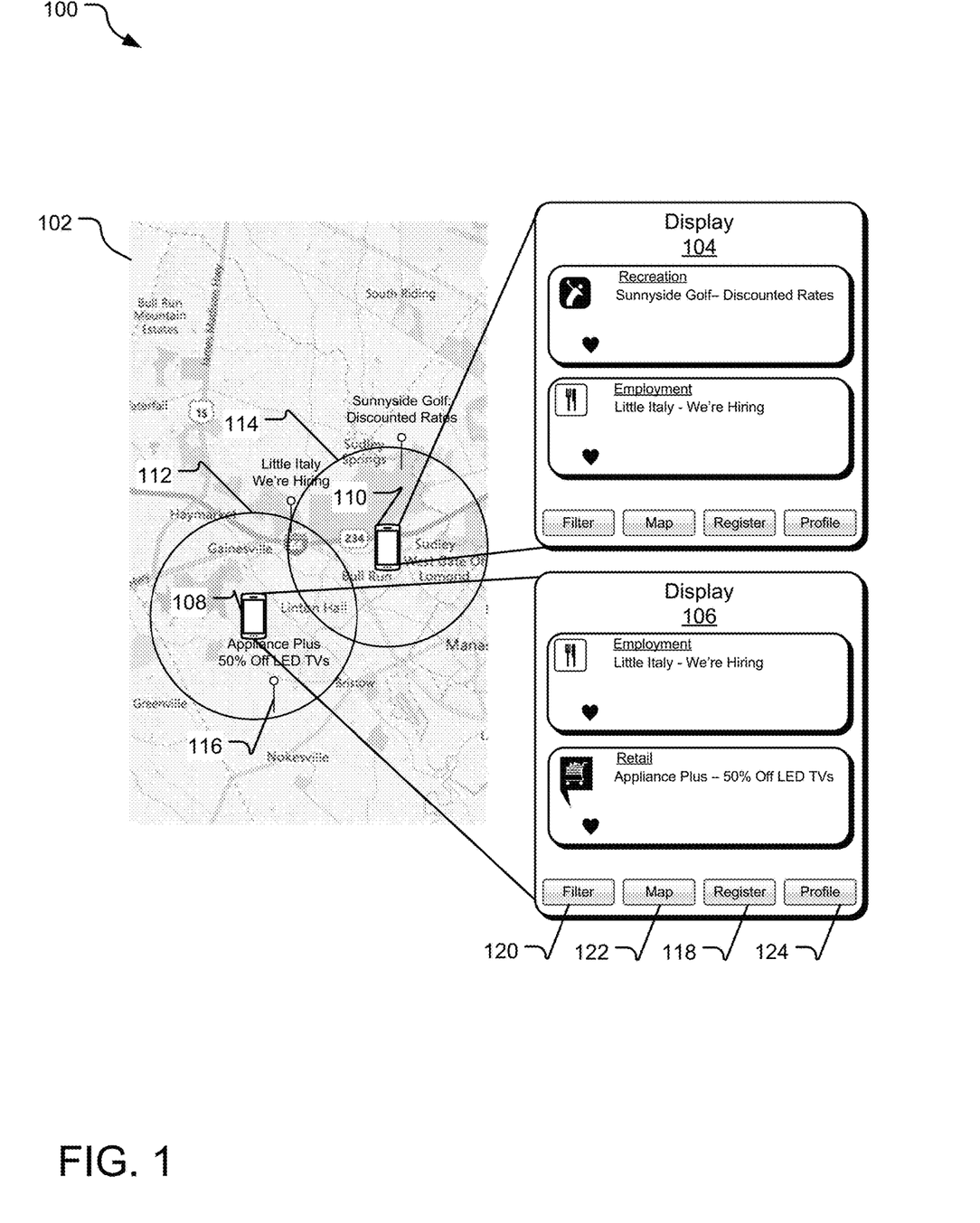
FIG. 1 illustrates an example implementation of geolocation restricted content registration and publication.

FIG. 1 illustrates an example implementation 100 of geolocation restricted content registration and publication. The implementation 100 includes a map 102 illustrating geographic locations of user devices 108 and 110. The user devices 108 and 110 may be computing devices such as mobile smartphones, tablets, desktops, laptops, etc. that are configured to communicate over a communication network such as a cellular network (e.g., 3G, 4G, LTE, 5G), Wi-Fi network, mesh network, etc. A browser application is installed on each of the user devices 108 and 110 and is configured for browsing geolocation restricted content.

A content management server (not shown) communicates with the user devices 108 and 110 through the communication network. The content management server manages geographically restricted publishing of content to the browser applications installed on the user devices 108 and 110. Registrant entities, such as businesses (e.g., retail businesses) with physical geographic locations, may register geographically restricted domains with the content management server. The geographically restricted domains are utilized by the registrant entities to publish geographically restricted content to user devices (e.g., the user devices 108 and 110). The geographically restricted domains may be referenced by unique registrant identifiers stored in association with the content management server. The unique registrant identifiers are generated responsive to a request, by the registrant entities, to generate the geographically restricted domains. The unique registrant identifiers may be a human-readable name of the registrant entity tied to a physical location and a geometric area encircling the physical location. The unique registrant identifiers further identify (e.g., via an IP address) a registrant content server, which may be a virtualized server managed by the content management server or a server managed by the registrant (or associated entity). For example, the unique registrant identifiers may be registered with a network address (e.g., an IP address) from which content and/or services can be served. In some example implementations, content and/or services are served from a web server. Furthermore, one example network address is an IP address, but other types of identifiers or addresses may be used.

For example, a golf course entity, referred to as "Sunnyside golf" in FIG. 1, requests a geographically restricted domain from the content management server. The request may be transmitted or processed using a browser application executing on a computing device (not shown) utilized by an administrator of the golf course. The request may include, without limitation, an identification of the entity (e.g., "Sunnyside Golf"), an indication of the real-world geographic location of the entity, an identification of a registrant content server (e.g., IP address), or a request for a virtualized registrant content server. The geographic location may include a physical address and/or geographic coordinates of the entity. In some example implementations, the content management server performs various verification processes before generating the unique registrant identifier that is based on the geographic location of the registrant entity.

After the unique registrant identifier is generated for the Sunnyside golf registrant, the registrant entity "publishes" content in association with the unique registrant identifier. Publishing of content may include transmitting various content objects (e.g., text data, video data, image data) to the registrant content server (e.g., a virtualized server or content server managed by the registrant or an associated entity). If the content management system server generates the virtualized registrant content server, then the content management system server stores the various content objects at the virtualized registrant content server in association with the unique registrant identifier that is based on the geographic location of the registrant entity and a geometric area encircling the geographic location of the registrant entity. Thus, the content objects are directly associated with the geographic location and geometric area of the registrant entity. In FIG. 1, Sunnyside Golf has published a content object that multicasts discounted rates via a corresponding unique registrant identifier. Similarly, a retail entity named "Appliance Plus" has established a unique registrant identifier that is based on the location of the store location and a geometric area encircling the store location. The map 102 includes a pin 116, which illustrates the location of the Appliance Plus store and the location on which the unique registrant identifier is based. Furthermore, Appliance Plus has transmitted a content object, which includes a sale (e.g., "50% off LED TVs") to the content management server to store in a virtualized registrant content server associated with Appliance Plus. Furthermore, a restaurant ("Little Italy") has established a unique registrant identifier (based on the geographic location of the Little Italy entity) and has communicated a content object that indicates that the restaurant is hiring to an associated registrant content server. Pins are also illustrated on the map 102 to indicate the geographic locations of the Little Italy entity and the Sunnyside golf course entity.

The browser applications executing on the user devices 108 and 110 may periodically transmit a query to the content management server. The queries include at least a specification of a geographic location identifier. In one example scenario, the geographic location identifier may indicate the current geographic location of the user devices 108 and 110, which may be detected using GPS or other geographic location detecting processes. In another scenario, the geographic location identifier is based on a section of geographic location by a user of a user device (e.g., the user devices 108 or 110). For example, a user may select a geographic location on a displayed map, such as to view content within a selected range of the selected geographic location. It should be understood that other methods of indicating a geographic location are contemplated.

In some example implementations, the queries transmitted by the user devices 108 and 110 further include a proximity condition, which, when satisfied, cause various content objects to be published to the user devices 108 and/or 110. For example, the proximity condition is satisfied by geographically restricted domains and/or content associated with geographically restricted domains when the unique registrant identifiers associated with the domains are within a certain range of the geographic location indicated by the query. In the same or alternative implementations, the proximity condition (e.g., a range) is determined by the server based on user preferences stored on the content management server or based on default or adjusted parameters selected by the content management server. For example, the content management server may determine a radius of 40 miles (e.g., default or determined by the registrant) for a particular registrant, and the unique registrant identifier for the registrant includes the area defined by a 40 mile radius in association with the physical location of the registrant. Accordingly, a query that indicates a query geographic location that falls within (or overlaps with) the area defined by the unique registrant identifier satisfies the proximity condition, and the content management server may identify and communicate with the registrant content server associated with the unique registrant identifier. In response to such communication, the registrant content server communicates with the user device.

Accordingly, when a query is received at the content management server from a user device (e.g., the user device 108 or 110), the content management server identifies one or more unique registrant identifiers that are based on a unique geographic source location identifier that is within a range (defined by a proximity condition) of the geographic location of the query. When such unique registrant identifiers are identified, content objects that are stored in association with the identified unique registrant identifiers may be published to the user device 108 or 110 by the corresponding registrant content servers.

In FIG. 1, the user device 108 is positioned in a geographic location as indicated by the position of the user device 108 on the map 102. Similarly, the user device 110 is in a geographic location as indicated by the position of the user device 110 on the map 102. The browsers executing on the user device 108 and 110 transmit queries to the content management server, and the queries indicate the current geographic location of the user devices 108 and 110, respectively. Furthermore, the queries may indicate a proximity condition that defines a geographic range or distance for receiving content. For example, the user device 108 may indicate a range 112 (e.g., three miles), which may be defined by user preferences as selected by the user utilizing the user device 108. Similarly, the user device 110 indicates a range 114, or in another example implementation or scenario, the range 114 is defined at the content management server and corresponds to each of the unique registrant identifiers.

In response to receiving the query, the content management server identifies unique registrant identifiers that satisfy the proximity condition and communicates with the corresponding registrant content servers such that associated content is published to the devices 108 and 110. With respect to the user device 108, the content management server identifies the entities, the Little Italy restaurant and the Appliance Plus retail store, as having unique registrant identifiers within the range 112 (e.g., satisfying the proximity condition) relative to the geographic location of the user device 108. The content management server identifies associated registrant content servers (virtualized or remote) and transmits a communication to the registrant content servers that identifies the user device 108 as satisfying the associated proximity condition. The user device 108 displays the content corresponding to the content objects on a display 106. With respect to the user device 110, the content management server identifies the entities, the Little Italy restaurant and the Sunnyside golf course, as being within the range 114 (e.g., satisfying the proximity condition) relative to the geographic location of the user device 110. The content management server identifies registrant content servers associated with the identified entities and transmits a communication such that content objects may be served to the user device 110. The user device 110 displays the corresponding to the content objects on a display 104.

It should be understood that the implementations described herein may be applicable to user devices (e.g., the user devices 108 and 110) with augmented reality (AR), virtual reality (VR), mixed mode, etc. capabilities. For example, the user device 108 is an augmented reality device, and the display 106 displays the content in augmented reality mode. The user device 108 may display the "Little Italy" content on the location of the Little Italy entity as viewed through a display when the user device 108 is in geographic (physically observable) proximity to the entity. Accordingly, a user may utilize an AR/VR capable device to view geographically pegged content when in observable proximity to the geographic location of the content.

In some example implementations, the content management server or the associated registrant content servers perform some filtering and/or ranking of content objects before the content objects are published to the user devices 108 and 110. For example, before the unique registrant identifiers are identified as satisfying the proximity conditions, the content management server may filter unique registrant identifiers from being analyzed based on user preferences stored at the content management server. Similarly, the associated registrant content servers may filter content objects after the unique registrant identifiers are identified as satisfying the proximity condition. For example, a user may not wish to receive content related to employment. Such preferences may be entered by the user at the user device (e.g., the user device 108) and saved at the content management server and/or the associated registrant content servers. Furthermore, the content management server may infer user preferences based on user feedback. If the user never or rarely selects or views content associated with employment, the content management server may infer that the user does not want to view such content. Accordingly, such content, even if determined to satisfy the proximity condition, may not be transmitted to the user devices (e.g., the user device 108 or 110). In other example implementations, the content management server may not identify unique registrant entities associated with registrant content servers that serve content that does not correspond to the user preferences.

Furthermore, users may filter content at the user devices 108 and 110. The browsers generate displays 104 and 106 include a filter button (e.g., a filter button 120 on display 106) that the user may utilize to filter received content. For example, the user may selectively view content associated with retail. Other methods of content filtering are contemplated.

A registrant entity (e.g., Little Italy) may utilize the browser application to create the unique registrant identifier. As illustrated in the display 106, the browser application displays a register button 118. Upon selection of the register button 118, the user may enter registrant entity information (e.g., entity name) and geographic location information for the entity (e.g., physical address and geographic coordinates). The content management server may verify the request and generate the unique registrant identifier for the registrant entity. The registrant entity may utilize the browser application to submit and manage content published in association with the unique registrant identifier.

The display 106 further includes a filter button 120, that may be utilized by a user to filter received content objects. A map button 122 of the browser application may be used to navigate to a map display, to select a geographic location for a query, and to view received content as geotagged to a location. A profile button 124 may be utilized to manage user preferences.

Figure 2:
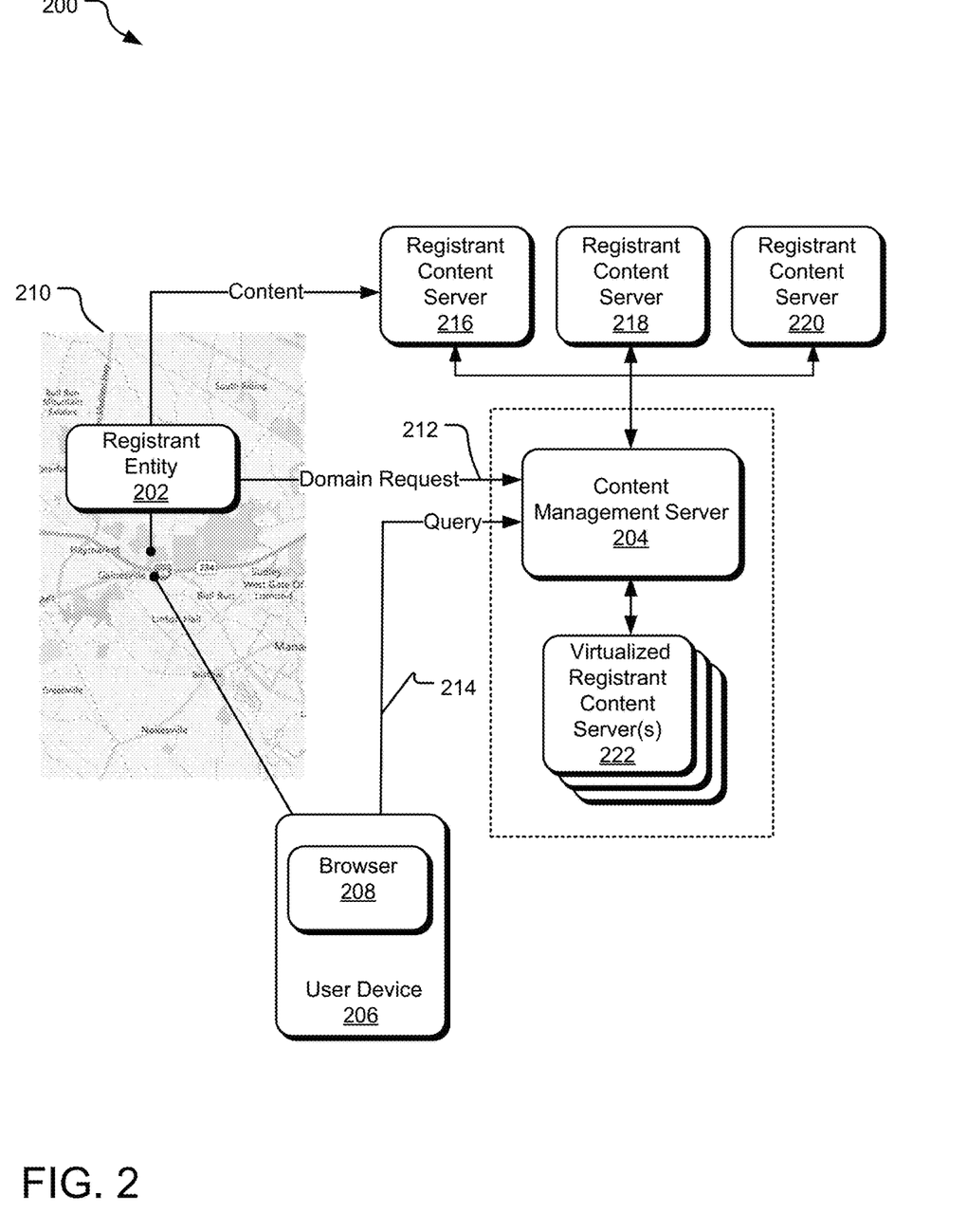
FIG. 2 illustrates a block diagram of an example system of geolocation restricted content registration and publication.

FIG. 2 illustrates a block diagram 200 of an example system of geolocation restricted content registration and publication. The block diagram 200 includes a registrant entity 202 in a physical location as depicted on a map 210. The block diagram 200 further includes a content management server 204, which manages geolocation restricted content publishing. The content management server 204 may be a distributed server implementation replicated in two or more different geographic locations. The registrant entity 202 transmits a domain request 212 to the content management server 204. The domain request 212 may be transmitted using a browser application executing on a computing device of the registrant entity 202, for example. The domain request 212 may include an identification of the entity, an indication of the geographic location of the entity, and an identification of a registrant content server or request for a virtualized content server. The geographic location may include a physical address and/or geographic coordinates of the entity.

In some example implementations, the content management server 204 performs various verification processes before generating the unique registrant identifier that is based on the geographic location of the registrant entity. For example, the content management server 204 may access a secretary of state database to verify the physical address of the entity. In some example implementations, the content management server determines whether any unique registrant identifier already exists for an entity at the provided physical address. Other verification methods are contemplated.

The content management server 204 verifies the request and generates a unique registrant identifier for the registrant entity 202. The unique registrant identifier is based on and is therefore associated with the geographic location of the entity and a geometric area encircling the physical location of the entity. The unique registrant identifier further identifies a registrant content server 216 (e.g., via a network address) for serving content associated with the registrant entity. In FIG. 2, the registrant content server 216 is a server managed by the registrant entity 202 or a party associated with the registrant entity 202. In some example implementations, the registrant entity 202 may utilize one of a virtualized registrant content server 222 generated and managed by the content management server 204. The registrant entity 202 further transmits content (e.g., as one or more content objects) to the registrant content server 216. The content objects "inherit" the geographic location of the registrant entity based on the associated unique registrant identifier. The content management server 204 utilizes the physical address of the registrant entity 202 to differentiate the geographical location of the registrant entity 202 and a geometric area encircling the registrant entity 202 from a registrant entity 202 and related geometric area in a same or similar geographic location. For example, when two registrant entities are in the same building, the content management server 204 differentiates the registrant entities and their respective unique registrant identifiers utilizing the physical address of the registrant entities (e.g., a suite number).

The block diagram 200 further includes a user device 206, which may be a smartphone, tablet, laptop, desktop, etc. A browser application 208 is stored in a memory (not shown) and executed by a processor (not shown) of the user device. The browser application 208 is configured for browsing geolocation restricted content. The browser application 208 transmits a query 214 to the content management server 204. The query 214 includes an indication of a geographic location. The indicated geographic location may be a current geographic location of the user device 206 or may be a geographic location selected by a user of the user device 206. For example, the user selects a geographic location (e.g., using a user interface of the user device 206) to browse geolocation restricted content in range of the selected geographic location.

The content management server 204 receives the query 214 including the indicated geographic location and identifies one or more unique registrant identifiers that satisfy a proximity condition relative to the indicated geographic location. The proximity condition may be indicated in the query 214 or may be stored in the content management server 204 in association with the unique registrant identifiers. The identification may include identifying unique registrant identifiers that are based on geographic locations within a proximity of the geographic location indicated by the query. One or more unique registrant identifiers in which the associated proximity conditions are satisfied by the identified, and the content management server 204 transmits communications that identify the user device 206 to the registrant content server(s) that are associated with the identified one or more unique registrant identifiers.

In FIG. 2, the user device 206 transmits the query 214 that identifies the current geographic location of the user device 206. The content management server 204 determines that the user device 206 is in proximity to the registrant entity 202 based on the unique registrant identifier associated with the registrant entity 202. The content management server informs the registrant content server 216 associated with the registrant entity 202 of the proximity of the user device 206. The registrant content server 216 may then communicate content to the user device 206 for display by the browser application 208.

In some scenarios, the registrant entity 202 may indicate an expiration date/time associated with specific content. For example, a restaurant entity may prefer that a discount is published by the content management server 204 for a week-long period. Accordingly, the respective registrant content servers store the expiration date/time and removes the content objects from potentially being published upon expiration of the expiration time. Such removal may include archiving the content or flagging the content such that the content is not published to the user device 206

In some example implementations, the registrant entity 202 indicates a geographic range (e.g., distance) for publication of certain content. For example, a restaurant entity may want to publish a happy hour deal within a small distance (e.g., ½ mile). Accordingly, the proximity condition may be based on specific distance associated with specific content. A query geographic location outside the indicated range does not satisfy the proximity condition, and thus, the user device 206 does not receive the associated content.

Because the unique registrant identifiers are based on fixed geographical location and content published in association with unique registrant identifiers inherit the fixed geographical location, a user of the user device 206 may view different content as the user moves about different physical locales. Accordingly, the browser application 208 may periodically transmit queries to the content management server 204 indicating the current geographical location of the user device 206. The content management server 204 may determine whether the received query geographic location is different from a previously received query and identified different registrant content servers responsive to determining that the geographic location is different. Furthermore, a new query may be transmitted to the content management server 204 by the browser each time the browser application 208 is opened or activated on the user device 206.

Figure 3:
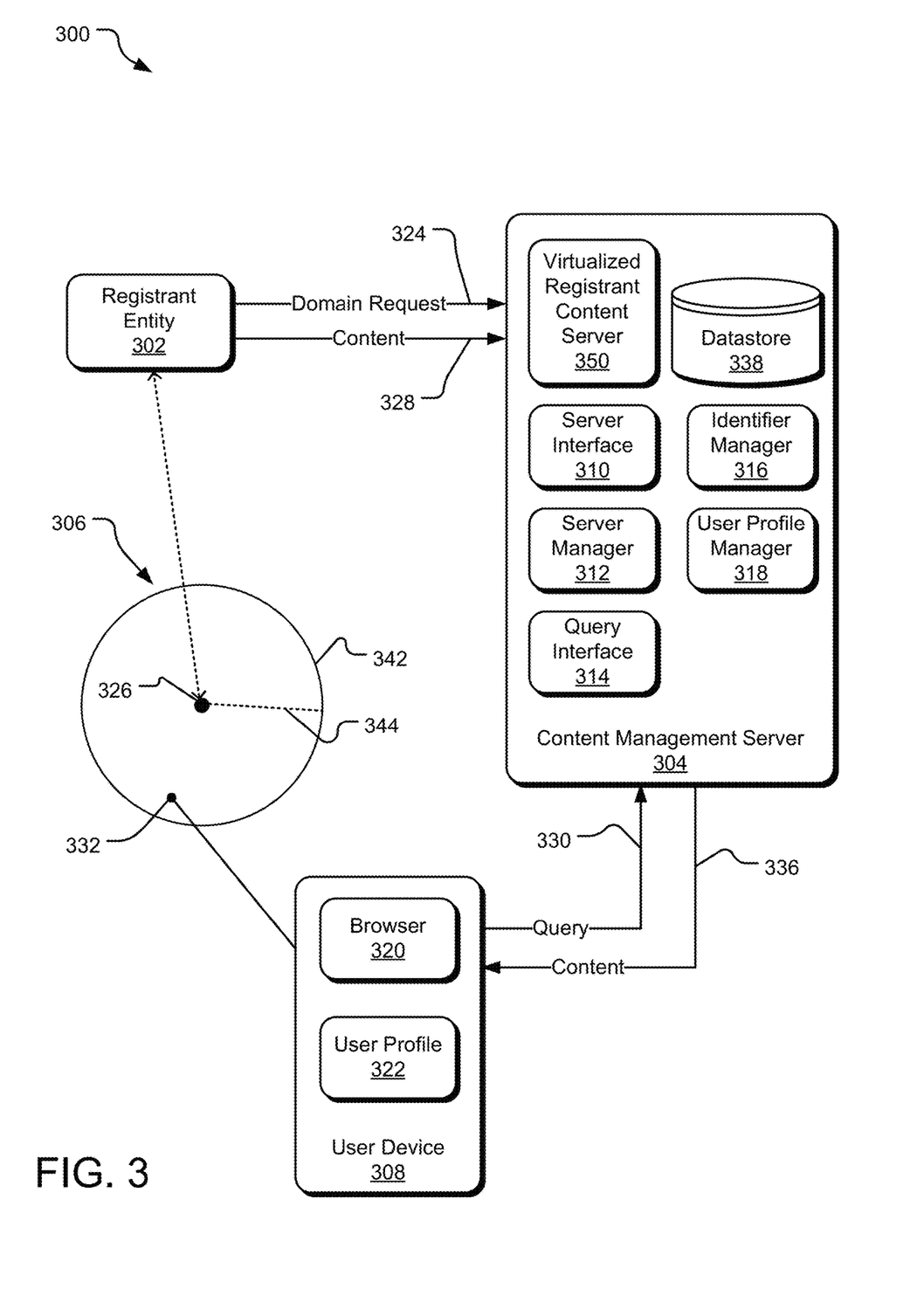
FIG. 3 illustrates another example block diagram of an example system for geolocation restricted content registration and publication.

FIG. 3 illustrates another example block diagram 300 of an example system for geolocation restricted content registration and publication. The block diagram 300 includes a registrant entity 302 and a content management server 304, which manages geolocation restricted content publishing. The content management server 304 receives a domain request 324 from the registrant entity 302 for a geographically restricted domain for publishing content. An identifier manager 316 of the content management server 304 receives the domain request 324, which includes an indication of a geographic location of the registrant entity, and the identifier manager 316 generates a unique registrant identifier 306 based on the geographic location of the registrant entity 302 and associates the unique registrant identifier 306 to a generated virtualized registrant content server 350. Thus, the unique registrant identifier 306 is associated with a physical location 326 of the registrant entity 302 and linked to the virtualized registrant content server 350. Accordingly, the unique registrant identifier is used to identify the physical location of the registrant entity and the network "location" of the associated registrant content server. In order to identify (e.g., locate) the registrant content server, in some example implementations, the proximity condition relative to the unique registrant identifier (e.g., overlapping geographic locations) is satisfied by a query. Various unique registrant identifiers may be stored in a datastore 338, which is accessible by the content management server 304. The unique registrant identifier 306 is based on a physical location 326 of the registrant entity 302 and a geometric area 342 surrounding the physical location 326 defined by a radius 344. The unique registrant identifier 306 is "unique" because it is based on an individually unique physical area (e.g., geographic coordinates and/or address) and a surrounding area defined by the radius 344.

When the content management server 304 manages a virtualized registrant content server for an entity, the content management server 304 receives content objects from registrant entities (e.g., the registrant entity 302) and stores the content objects in the associated registrant content servers (e.g., the virtualized registrant content server 350). In some example implementations, the content management server 304 verifies access to a unique registrant identifier by the entity sending the content objects. Such verification may include verifying username and passwords, verifying cryptographic signatures, etc. The content management server 304 stores the received content objects in the datastore 338 in association with the corresponding registrant content servers. For example, content 328 received from the registrant entity 302 is stored in the datastore 338 in association with the virtualized registrant content server 350 associated with the unique registrant identifier 306.

A query interface 314 of the content management server 304 receives queries from user devices (e.g., a query 330 is received from a user device 308). The queries include at least a query geographic location, which may be detected as a current location of a user device or may be selected by a user of the user devices. For example, the query 330 includes a geographic location 332.

A content server manager 312 analyzes the received query geographic location and identifies one or more unique registrant identifiers that have proximity conditions satisfied by the query geographic location. To make such identifications, the content server manager 312 may calculate distances between the query geographic location and unique registrant identifiers. In other words, the content server manager 312 determines whether the query geographic location overlaps with the geographic area covered by each of the unique registrant identifiers. The content server manager 312 then communicates with registrant content server associated with the identified unique registrant identifiers.

The communications include an identification of the user device(s) that satisfy the proximity conditions relative to the unique registrant identifiers.

In FIG. 3, the content server manager 312 determines that the query geographic location 332 is within the geometric area 342 corresponding to the unique registrant identifier 306 associated with the registrant entity 302. Thus, the server interface 310 communicates with the virtualized registrant content server 350, which is associated with the registrant entity 302 based on the unique registrant identifier 306. Such communication includes at least an identification of the user device 308 satisfying the proximity condition associated with the unique registrant identifier 306. Thus, the virtualized registrant content server 350 may serve content to the user device 308.

In some example implementations, the content management server 304 includes a user profile manager 318 that stores and updates preferences associated with user devices (e.g., the user device 308). The preferences may be selected by a user or inferred based on user interaction with transmitted content. Accordingly, the content management server 304 may perform various filtering, ranking, and matching techniques when identifying registrant content servers. For example, the content management server 304 determines whether content or unique registrant identifiers stored in the datastore 338 satisfy a user matching condition based on user preferences and user profiles. Similarly, the browser application 320 executable by the user device 308 may manage a user profile 322 and may filter received content objects based on the user profile 322. The user profile may be further used to store a proximity condition (e.g., a range) for selecting content objects. Accordingly, the browser application 320 may transmit the proximity condition associated with the user profile 322 to the content management server 304 with the query 330.

Figure 4:
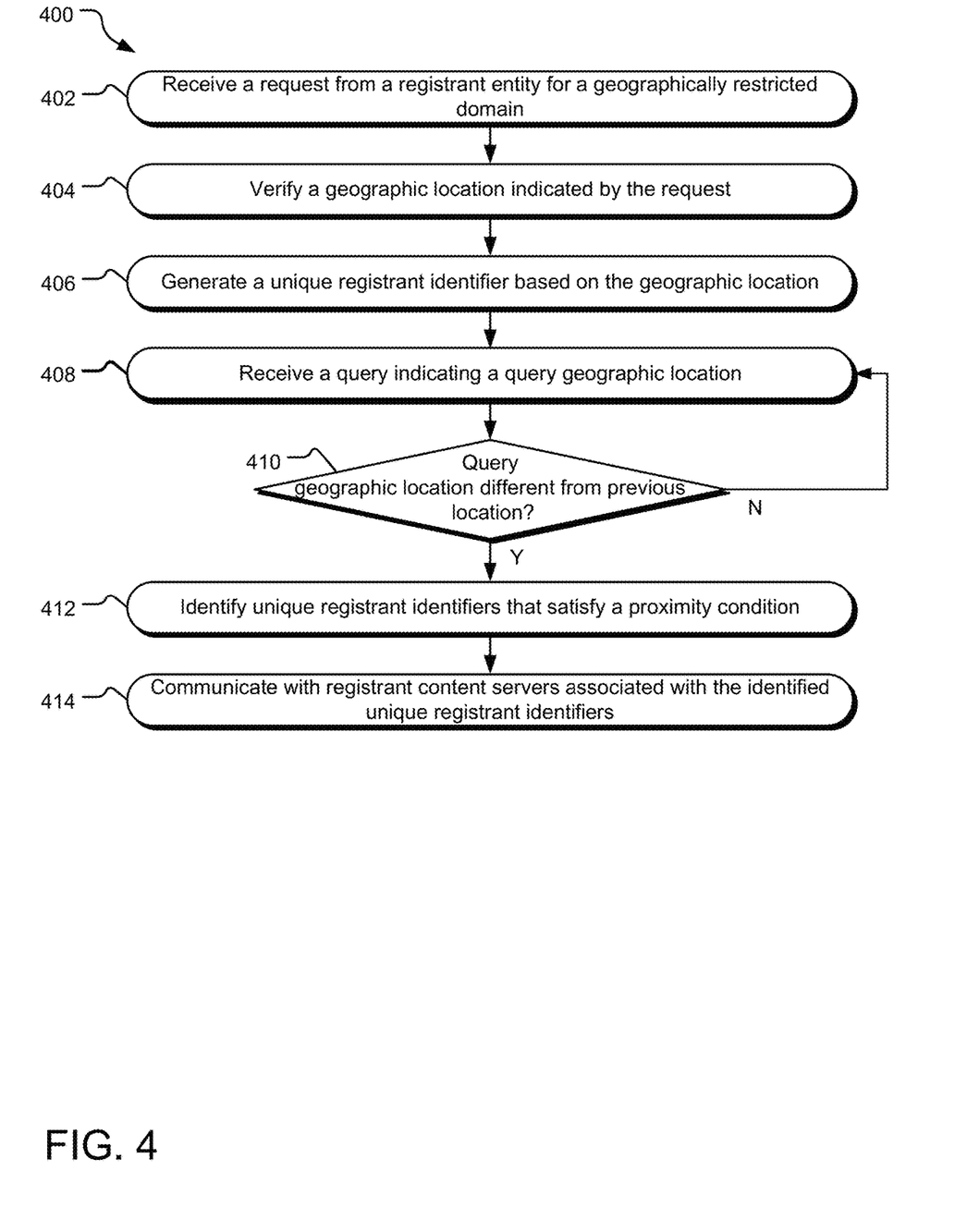
FIG. 4 illustrates example operations for geolocation restricted content registration and publication.

FIG. 4 illustrates example operations 400 for geolocation restricted content registration and publication. A receiving operation 402 receives a request from a registrant entity for a geographically restricted domain. A verifying operation 404 verifies a geographic location indicated by the request. The verifying operation 404 may include verifying a valid address and geographic coordinates. A generating operation 406 generates a unique registrant identifier based on the verified geographic location. An associating operation 408 associates the generated unique registrant identifier to a registrant content server. The registrant content server may be a remote server managed by the registrant entity or a virtualized registrant content server generated and managed locally. Such association may include storing an IP address or other server identifying information in association with the unique registrant identifiers. The operations 402 to 408 may be performed for various registrant entities.

A receiving operation 408 receives a query indicating a query geographic location. In some example implementations, the query further includes a proximity condition that may indicate a range or distance for receiving content objects. A determining operation 410 determines whether the query geographic location is different from the new location. If the query geographic location is not different, then the system waits until a new query is received in the receiving operation 412. If the geographic location is different from the previous geographic location, an identifying operation 412 identifies one or more unique registrant identifiers that satisfy a proximity condition. In some example implementations, the identifying operation 412 calculates the distance between the query geographic location and the geographic locations associated with each (or a subset) of unique registrant identifiers. In some example implementations, the identifying operations 412 identifies unique registrant identifiers that include an area covering (e.g., overlapping with) the query geographic location. A communicating operation 414 communicates with one or more registrant content servers associated with the identified unique registrant identifiers. Such communication may include an identification of the user device that satisfies the associated proximity condition. The registrant content servers may then serve content to the user devices.

Figure 5:
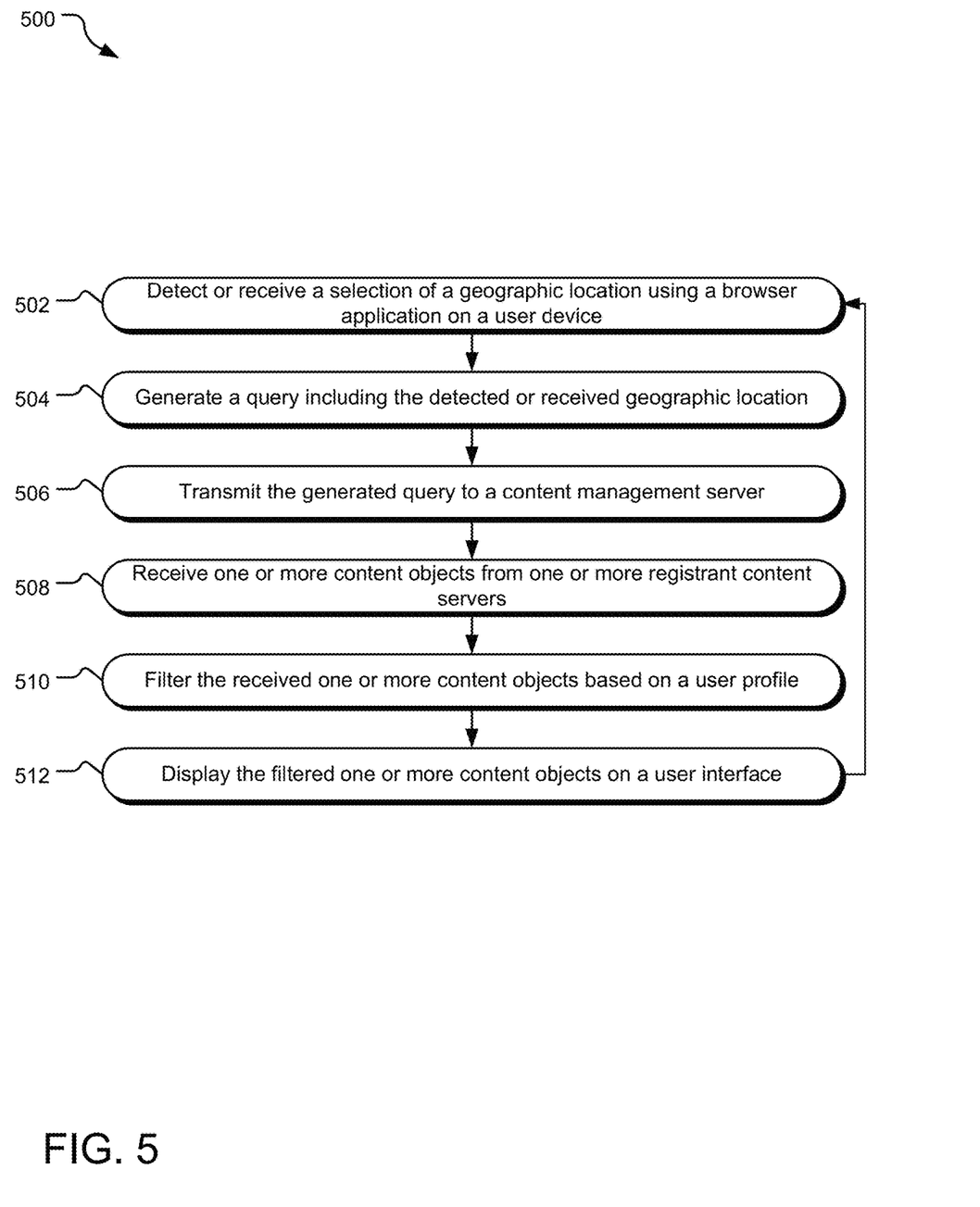
FIG. 5 illustrates example operations for geolocation restricted content registration and publication.

FIG. 5 illustrates example operations 500 for geolocation restricted content registration and publication. A detecting or receiving operation 502 detects or receives a selection of a geographic location using a browser application on a user device. A generating operation 504 generates a query including the detected or received geographic location. The generated query may include a proximity condition and/or query content (e.g., a search query entered by the user). A transmitting operation 506 transmits the generated query to a content management server. A receiving operation 508 receives one or more content objects from one or more registrant content servers. A filtering operation 510 filters the received one or more content objects based on a user profile stored in association with the browser. In some example implementations, the user device further refines received content objects based on an finer granularity (relative to the calculation performed at the server) distance calculation between the geographic location of the user device (or the user selected geographic location) and the received content objects, as associated with a geographic location of the entity based on the unique registrant identifier. A displaying operation 512 displays the filtered one or more content objects on a user interface. The process may return to the detecting or receiving operation 502 when the browser is subsequently opened, or after a period of time, or when a user enters a new query.

Figure 6:
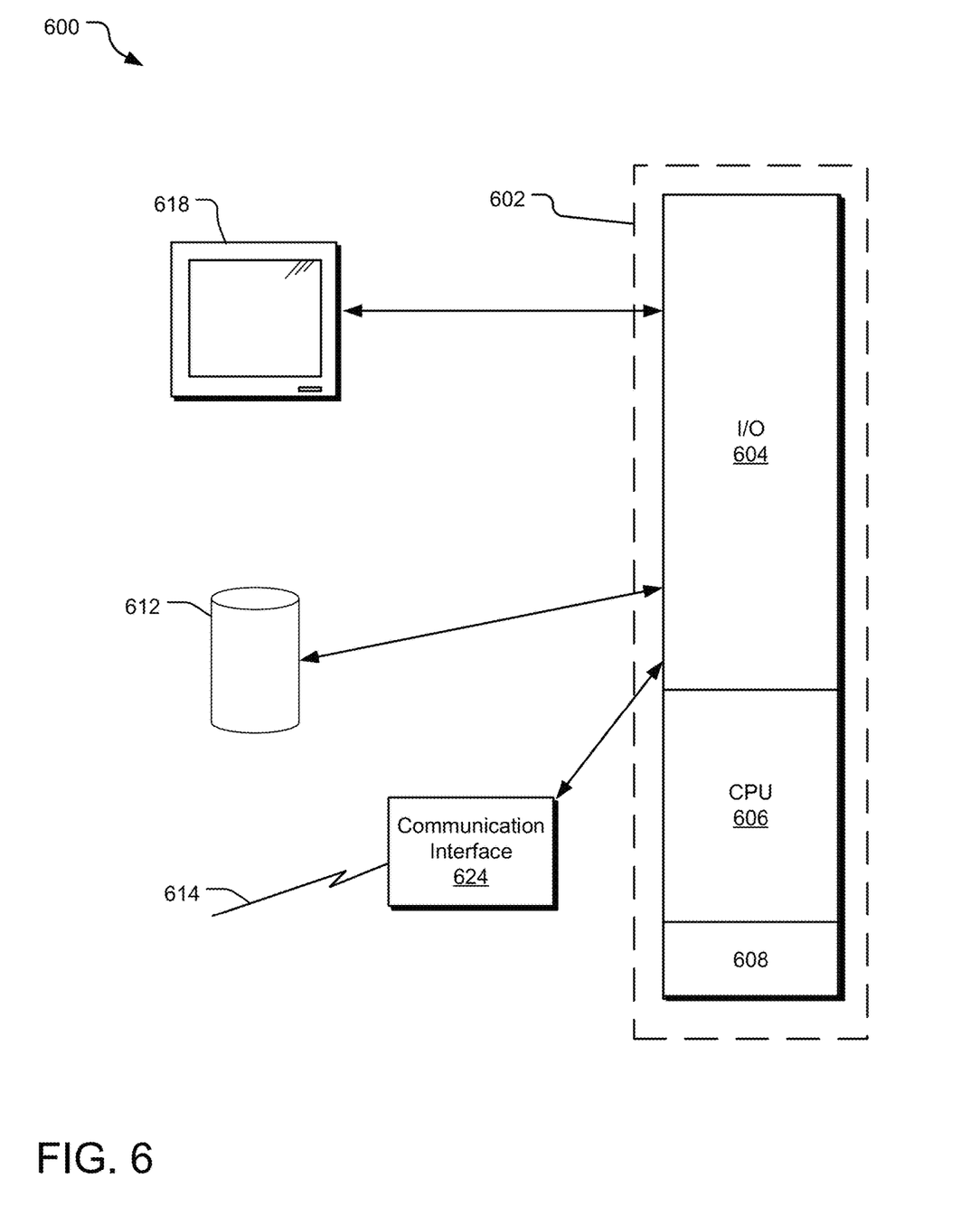
FIG. 6 illustrates an example processing device that may be useful in implementing the described technology.

FIG. 6 illustrates an example processing system 600 that may be useful in implementing the described technology. The processing system 600 is capable of executing a computer program product embodied in a tangible processor-readable storage medium to execute a computer process. Data and program files may be input to the processing system 600, which reads the files and executes the programs therein using one or more processors. Some of the elements of a processing system 600 are shown in FIG. 6 wherein a processor 602 is shown having an input/output (I/O) section 604, a Central Processing Unit (CPU) 606, and a memory section 608. There may be one or more processors 602, such that the processor 602 of the processing system 600 comprises a single central-processing unit 606, or a plurality of processing units. The processors may be single core or multi-core processors. The processing system 600 may be a conventional computer, a distributed computer, or any other type of computer. The described technology is optionally implemented in software loaded in memory 608, a disc storage unit 612, and/or communicated via a wired or wireless network link 614 on a carrier signal (e.g., Ethernet, 3G wireless, 6G wireless, LTE (Long Term Evolution)) thereby transforming the processing system 600 in FIG. 6 to a special purpose machine for implementing the described operations.

The I/O section 604 may be connected to one or more user-interface devices (e.g., a keyboard, a touch-screen display unit 618, etc.) or a disc storage unit 612. Computer program products containing mechanisms to effectuate the systems and methods in accordance with the described technology may reside in the memory section 608 or on the storage unit 612 of such a system 600.

A communication interface 624 is capable of connecting the processing system 600 to an enterprise network via the network link 614, through which the computer system can receive instructions and data embodied in a carrier wave. When used in a local area networking (LAN) environment, the processing system 600 is connected (by wired connection or wirelessly) to a local network through the communication interface 624, which is one type of communications device. When used in a wide-area-networking (WAN) environment, the processing system 600 typically includes a modem, a network adapter, or any other type of communications device for establishing communications over the wide area network. In a networked environment, program modules depicted relative to the processing system 600 or portions thereof, may be stored in a remote memory storage device. It is appreciated that the network connections shown are examples of communications devices for and other means of establishing a communications link between the computers may be used.

In an example implementation, a browser application, a content management server, and other modules or programs may be embodied by instructions stored in memory 608 and/or the storage unit 612 and executed by the processor 602. Further, local computing systems, remote data sources and/or services, and other associated logic represent firmware, hardware, and/or software, which may be configured to assist in geolocation restricted content publishing. A geolocation restricted content publishing system may be implemented using a general-purpose computer and specialized software (such as a server executing service software), a special purpose computing system and specialized software (such as a mobile device or network appliance executing service software), or other computing configurations. In addition, user profile and preference data, identifiers, location data, proximity conditions, profile matching data, and query data may be stored in the memory 608 and/or the storage unit 612 and executed by the processor 602.

The implementations of the invention described herein are implemented as logical steps in one or more computer systems. The logical operations of the present invention are implemented (1) as a sequence of processor-implemented steps executed in one or more computer systems and (2) as interconnected machine or circuit modules within one or more computer systems. The implementation is a matter of choice, dependent on the performance requirements of the computer system implementing the invention. Accordingly, the logical operations making up the implementations of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

Data storage and/or memory may be embodied by various types of storage, such as hard disk media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" (e.g., memory 608) means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" or "storage medium" expressly does not include a transitory medium such as a carrier signal, but the computer instructions can be transferred to the memory wirelessly.

The above specification, examples, and data provide a complete description of the structure and use of exemplary implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. While embodiments and applications of this invention have been shown, and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method comprising:
    generating a plurality of unique registrant identifiers, each of the plurality of unique registrant identifiers being based on a unique geographic source location identifier identifying a geographic location and a proximity condition defining a geographic area, the geographic area containing the geographic location, the each of the plurality of unique registrant identifiers identifying a registrant content server, each of the registrant content servers storing content associated with the corresponding unique registrant identifier;
    receiving a query from a user device, the query specifying a query geographic location;
    identifying at least one unique registrant identifier of the plurality of unique registrant identifiers responsive to receiving the query, the identification being based on the query geographic location satisfying the proximity condition corresponding to the at least one unique registrant identifier; and
    transmitting a communication to at least one registrant content server corresponding to the identified at least one unique registrant identifier, the communication identifying the user device as satisfying the proximity condition corresponding to the identified at least one unique registrant identifier.

2. The method of claim 1 further comprising:
    determining a geographic distance between the at least one unique registrant identifier and the query geographic location, satisfaction of the proximity condition being determined based on the determined geographic distance.

3. The method of claim 1 wherein the at least one registrant content server is a virtualized registrant content server stored locally at a content management server.

4. The method of claim 1 wherein the at least one registrant content server is a remote registrant content server.

5. The method of claim 1 wherein the query geographic location is detected by the user device.

6. The method of claim 1 wherein the query geographic location is selected by a user of the user device.

7. The method of claim 1 further comprising:
determining whether the query geographic location is different from a previous query geographic location prior to identifying the at least one unique registrant identifier.

8. The method of claim 1 wherein the query geographic location and the proximity condition for each of the plurality of unique registrant identifiers define a geographic area where user devices may receive content associated with the corresponding unique registrant identifier.

9. The method of claim 1 wherein generation of each of the plurality of unique registrant identifiers is based on a unique geographic source location identifier.

10. The method of claim 1 wherein generation of each of the plurality of unique registrant identifiers is based on a proximity condition.

11. A content management server comprising:
one or more processors;
an identifier manager executed by the one or more processors and configured to generate a plurality of unique registrant identifiers, each of the plurality of unique registrant identifiers being based on a unique geographic source location identifier identifying a geographic location and a proximity condition defining a geographic area, the geographic area containing the geographic location, the each of the plurality of unique registrant identifiers identifying a registrant content server, each of the registrant content servers storing content associated with the corresponding unique registrant identifier;
a query interface executed by the one or more processors and configured to receive a query from a user device, the query specifying a query geographic location;
a content server manager executed by the one or more processors and configured to identify at least one unique registrant identifier of the plurality of unique registrant identifiers responsive to receiving the query, the identification based on the query geographic location satisfying the proximity condition corresponding to the at least one unique registrant identifier; and
a server interface executed by the one or more processors and configured to transmit a communication to at least one registrant content server corresponding to the identified at least one unique registrant identifier, the communication identifying the user device as satisfying the proximity condition corresponding to the identified at least one unique registrant identifier.

12. The content management server of claim 11 wherein the at least one registrant content server is a virtualized registrant content server stored locally at the content management server.

13. The content management server of claim 11 wherein the at least one registrant content server is a remote registrant content server.

14. The content management server of claim 11 wherein the content server manager is further configured to determine a geographic distance between the at least one unique registrant identifier and the query geographic location, satisfaction of the proximity condition being determined based on the determined geographic distance.

15. The content management server of claim 11 wherein the query geographic location is detected by the user device.

16. The content management server of claim 11 wherein the query geographic location is selected by a user of the user device.

17. One or more tangible processor-readable storage media encoding processor-executable instructions for executing on a computer system a process comprising:
generating a plurality of unique registrant identifiers, each of the plurality of unique registrant identifiers being based on a unique geographic source location identifier identifying a geographic location and a proximity condition defining a geographic area, the geographic area containing the geographic location, the each of the plurality of unique registrant identifiers identifying a registrant content server, each of the registrant content servers storing content associated with the corresponding unique registrant identifier;
receiving a query from a user device, the query specifying a query geographic location;
identifying at least one unique registrant identifier of the plurality of unique registrant identifiers responsive to receiving the query, the identification being based on the query geographic location satisfying the proximity condition corresponding to the at least one unique registrant identifier; and
transmitting a communication to at least one registrant content server corresponding to the identified at least one unique registrant identifier, the communication identifying the user device as satisfying the proximity condition corresponding to the identified at least one unique registrant identifier.

18. The one or more tangible processor-readable storage media of claim 17 wherein process further comprises:
determining a geographic distance between the at least one unique registrant identifier and the query geographic location, satisfaction of the proximity condition being determined based on the determined geographic distance.

19. The one or more tangible processor-readable storage media of claim 17 wherein the at least one registrant content server is a virtualized registrant content server stored locally at a content management server.

20. The one or more tangible processor-readable storage media of claim 17 wherein the at least one registrant content server is a remote registrant content server.

21. The one or more tangible processor-readable storage media of claim 17 wherein the query geographic location is detected by the user device.

22. The one or more tangible processor-readable storage media of claim 17 wherein the query geographic location is selected by a user of the user device.

* * * * *